United States Patent [19]
Armasow

[11] 3,818,782
[45] June 25, 1974

[54] APPARATUS FOR CONTROLLING THE SPEED OF A TRANSMISSION WITH BALANCING MEANS FOR A FLUID REGULATOR VALVE

[75] Inventor: Waldemar Armasow, Heidenheim, Germany

[73] Assignee: Voith Getriebe KG, Heidenheim, Germany

[22] Filed: May 10, 1973

[21] Appl. No.: 359,028

[30] Foreign Application Priority Data
May 16, 1972 Germany............................ 2223745

[52] U.S. Cl.................................. 74/720.5, 74/782
[51] Int. Cl............................................. F16h 37/08
[58] Field of Search................... 74/720.5, 720, 782; 180/6.7

[56] References Cited
UNITED STATES PATENTS
3,520,376   7/1970   Muller ........................... 74/720.5 X
3,620,319   11/1971   Armasow ......................... 180/6.7 X

*Primary Examiner*—Samuel Scott
*Assistant Examiner*—J. Reep
*Attorney, Agent, or Firm*—Michael S. Striker

[57] ABSTRACT

For driving the two tracks of a track laying vehicle at different speeds in a curve, left and right drive elements are connected by differential transmissions with a drive shaft and with a control shaft which is connected by other differential transmissions with the rotors of fluid brake devices, and with another drive shaft. The brake devices are only effective when filled with fluid under the control of a regulating valve piston. First sensing means measure the speed of the drive shaft means and produce first fluid pressure signals for operating a control piston. Second sensing means measure the speed of the control shaft or of a part connected thereto in linear speed relation, and produce second fluid pressure signals for operating a regulating piston. A double-armed balancing lever has arms engaged by the control piston and the regulating piston, respectively, so that a position of equilibrium is obtained when the left and right drive elements rotate at a desired speed. When one of the brake devices is filled and exerts a brake action, the drive elements rotate at a different speed for moving the vehicle in a curve. The control piston has a cylinder which can be manually moved along the respective arm of the balancing lever to change the effective lever arm of the control piston in accordance with the desired speed so that the balancing lever is displaced until the desired speed becomes the actual speed.

13 Claims, 2 Drawing Figures

APPARATUS FOR CONTROLLING THE SPEED OF A TRANSMISSION WITH BALANCING MEANS FOR A FLUID REGULATOR VALVE

BACKGROUND OF THE INVENTION

The U.S. Pat. No. 3,601,211 and 3,620,320 are directed to related subject matter.

The present invention relates to a regulating valve which serves the purpose to operate an output shaft, which is driven from a drive shaft rotating at a predetermined speed through a hydrodynamic means at a desired rotary speed, selected by a means for setting the apparatus to a predetermined desired speed. Valves of this type are used for fans and blowers whose rotary speed is regulated for selecting or maintaining a predetermined temperature, or temperature range of the medium which is to be cooled. The function of the means for selecting a desired speed is carried out by a thermostat set to the desired temperature range.

Apparatus of this type can also be applied to vehicles steered by endless tracks operated at different speeds on opposite sides of the vehicle. In vehicles of this type, the tracks always remain in a position on longitudinal direction of the vehicle, and a curve is driven by increasing the speed of the outer track over the speed of the inner track. The two tracks are driven by drive elements from a transmission by means of two differential transmissions having freely movable transmission parts connected by a control shaft which is at standstill when the control shaft, also called "zero" shaft, is stopped. The rotation of the control shaft in one direction is accelerated by one track and in the other direction decelerated. Steering is controlled from the motor shaft through a hydrodynamic fluid operated means which causes rotation of the control shaft in the desired direction. By the differential transmissions, the required speed difference between the outer and inner tracks is obtained when driving through a curve.

It is a disadvantage of an arrangement of this type that the radius selected by the operation of a steering lever or wheel cannot be maintained without difficulties. Variations of the ground surface, shifting of gears, and accelerations and decelerations of the main drive shaft means influence the rotary speed of the control shaft and of the differential transmissions, and alter the selected radius of the curve.

It has been found that a selected radius of the curve remains the same, if the ratio between the input and output speed of the steering transmission is maintained constant in accordance with the selected radius of the curve.

SUMMARY OF THE INVENTION

It is the object of the invention to provide hydrodynamic fluid operated means with a filling regulating valve by which, within a predetermined range of rotary speed regulation, a desired ratio between the primary rotary speed of the drive shaft to the secondary rotary speed of the output shaft, can be continuously set, and maintained independently of variations of the above rotary speeds.

Another object of the invention is to provide a simple and inexpensive apparatus permitting a quick adaptation of the degree of filling of the hydrodynamic fluid operated means to changed conditions.

With these objects in view, the present invention provides a control piston subject to fluid pressure corresponding to the primary rotary speed, and a regulating piston controlling the filling of the hydrodynamic fluid operated means and being subjected to pressure corresponding to the secondary speed. The two pistons abut a balancing lever, and the effective lever arm of the control piston can be manually varied for selecting a desired speed. The regulating piston is used for controlling the filling of the hydrodynamic fluid operated means, preferably a fluid operated brake.

Due to this arrangement, the direct and fast regulations of the degree of filling of a hydrodynamic fluid operated means is obtained, and thereby a regulation of the rotary speed effected, while due to the control of the primary rotary speed, speed variations of the drive shaft are immediately considered, without reducing or exceeding the range of regulation determined by the selected desired speed.

A particular advantage of the invention is a simple construction and the use of only few movable parts, so that a very precise regulation can be carried out.

In the apparatus of the invention, the pressures produced by the primary speed of the input drive shaft and the secondary speed of the control shaft or output shaft are compared. The control by the means for selecting a desired speed can be carried out by electrical, mechanical or hydraulic means. In the normal position of the apparatus, the control piston and the regulating piston, together with the balance lever, are in equilibrium, and oil circulation is constant. By variations of the primary or secondary rotary speed, or by a signal from the desired speed selector, the equilibrium is disturbed. The regulating piston changes its position so that at the same time the inlet cross section and outlet cross section for the filling medium of the hydrodynamic fluid operated means is changed. The change of the degree of filling, results in a speed variation of the secondary speed. Due to the pressure change caused in this manner by the changed secondary speed, a feedback to the regulating valve takes place. In this manner, equilibrium is again obtained on the balancing lever, while the regulating piston is stopped in its new position, and the variation of the degree of filling terminated. The variation of the rotary secondary speed necessairly takes place in the same ratio as the variation of the primary speed. Upon a pressure signal of the selector for the desired speed, the effective lever arms, and thereby the equilibrium at the balancing lever is disturbed, and return to the position of equilibrium is obtained as described above.

In accordance with the invention, speed measuring means producing fluid pressure signals representing the speed, are provided for measuring the primary input speed and the secondary output speed.

In a preferred embodiment of the invention, the selector of the desired speed is a slide secured to the cylinder of the control piston, so that the point of engagement between the control piston and the respective arm of the balancing lever can be varied by means of the "desired speed" selector. Consequently, variations caused by the desired speed selector have an immediate effect on the degree of filling.

In accordance with the invention, the measuring means for the secondary speed act on the regulating piston, and the measuring means for measuring the primary speed act on the control piston.

It is advantageous to provide the end faces of the control and regulating pistons with central projections engaging the balancing lever so that the contact face portion and the respective friction are small, which favorably influences the precision of the regulation.

If the apparatus of the invention is used for track laying vehicles, the drive shaft of the transmission, or a shaft whose rotary speed is related by a simple linear equation with the rotary speed of the drive shaft, is provided with a first rotary speed sensing or measuring means, while the output shaft of the transmission the control shaft, also called "zero" shaft, or a shaft whose rotary speed is related by a simple linear equation with the rotary speed of the output shaft, is provided with second sensing or measuring means for the rotary speed, while a slide operated by a steering lever performs the function of selecting the desired output speed by displacing the cylinder of the control piston.

In this manner, the result is obtained that the vehicle maintains a constant curve radius once the radius is selected by operation of the steering means, independently of the speed of the drive shaft and of the ground surface, and independent of a transmission.

In accordance with another feature of the invention, the control cylinder and piston are connected by a pressure conduit with a speed measuring means measuring the speed of the input shaft, or a corresponding shaft whose rotary speed is related in accordance with a simple linear equation with the rotary speed of the input shaft, while the regulating piston is connected by a pressure conduit with a speed measuring means measuring the speed of the output shaft the control shaft, or a corresponding shaft whose speed is related with the output shaft in accordance with a linear equation.

The hydrodynamic fluid operated means preferable include two hydrodynamic brake devices, each having a stator and a rotor, the rotor rotating at the same rotary speed when the control shaft is at a standstill in accordance with the operation of the steering means. For causing rotation of the control shaft, one of the two brake devices is filled with fluid, causing a drop of the rotary speed, while the rotary speed of the other brake device increases accordingly. For measuring the speed of the control shaft, two measuring means, cooperating with the two rotors of the brake device, are advantageously provided.

According to another feature of the invention, the measuring means which measures the speed of the control shaft, and influences the degree of filling of the operative brake device, produces fluid pressure signals acting on the rotor of the empty brake device which operates at a higher rotary speed. This arrangement assures a particularly quick reaction of the apparatus. Since the measuring means measure the pressure head, it is necessary that a minimum speed is present. If the measuring means would be directly cooperate with the control shaft, an unprecise measuring would take place if the steering displacement is small, since the control shaft rotates at a low speed. In the opposite case, when the steering displacement is very great, the rotor of the respective brake device is almost at a standstill. In the arrangement of the invention where the measuring means is mounted to measure the speed of the rotor of the empty brake device, a particularly accurate measuring is obtained. During straight drive of the vehicle, the rotor rotates at a normal speed, and upon a displacement of the steering means, the rotary speed increases with the respective displacement.

The apparatus of the invention can also be used for steering vehicles steered in accordance with a differential rotary speed, in which only one hydrodynamic brake device is used. Such an arrangement for track laying vehicles with a single hydrodynamic brake device is disclosed in the German OS 1,780,165.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
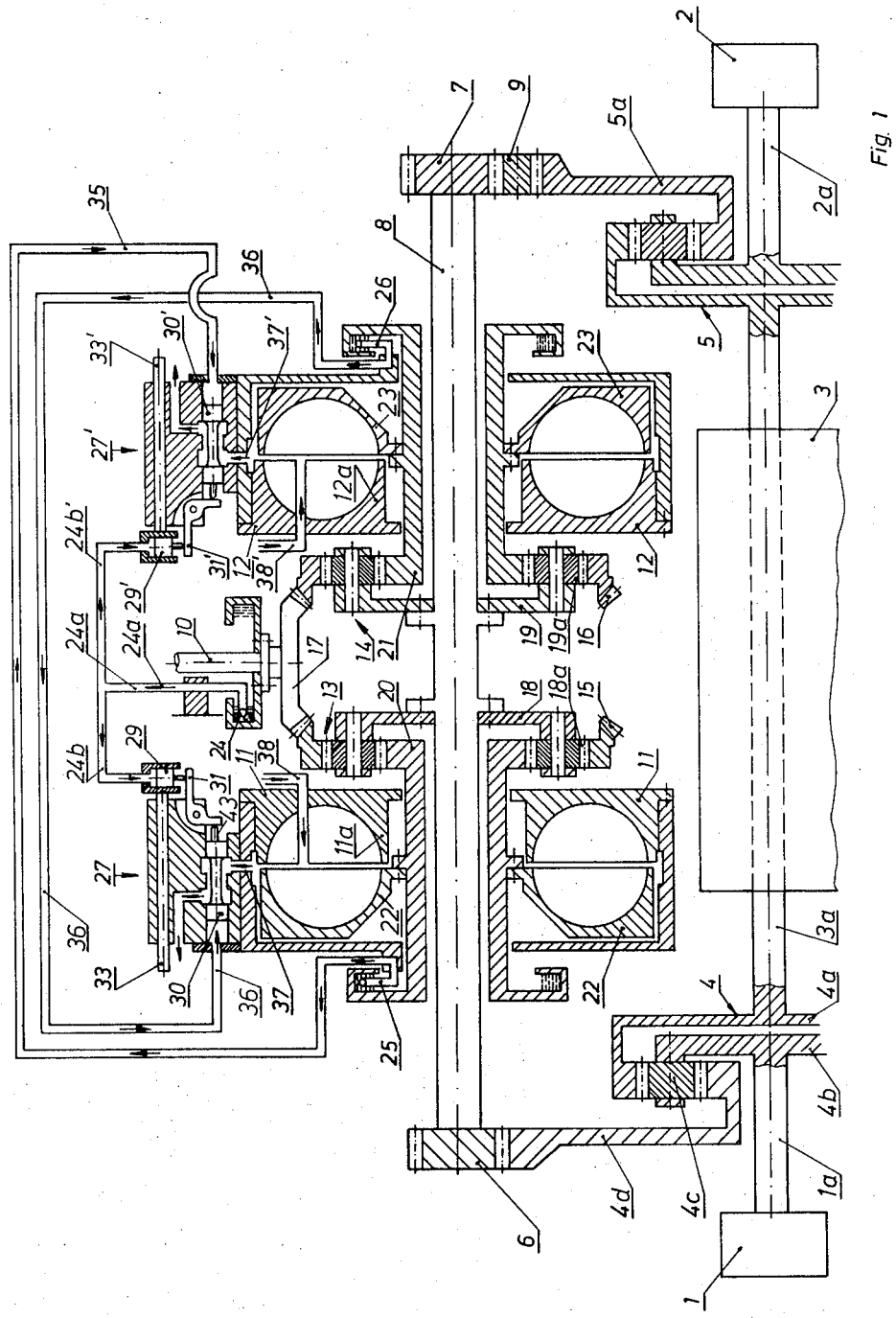
FIG. 1 is a schematic sectional view illustrating an apparatus of the invention with two filling regulating valves according to the invention.

Referring now to the drawing, and particularly to FIG. 1, two drive elements 1 and 2 for driving the tracks of a track laying vehicle, not shown, are driven by a motor, not shown, through a transmission 3 which includes a shaft 3a connected by differential transmissions 4 and 5 with the output shafts 1a and 2a. Two differential transmissions 4 and 5 have the same construction, but are arranged in a mirror-image arrangement. A control shaft or "zero" shaft 8 has spur gears 6 and 7 at the ends, and a reversing gear 9 meshes with spur gear 7. The differential transmission 4 includes an orbit gear 4a secured to shaft 3a, a planetary carrier 4b with planetary gears 4c, and a sun gear 4d with an outer gear meshing with spur gear 6. Transmission 5 is constructed in the same way, and has a sun gear 5d with an outer ring meshing with the reversing gear 9.

When control shaft 8 is at a standstill, the drive elements 1 and 2 are rotated at the same speed at which shaft 3a rotates. When control shaft 8 rotates, the speed of one of the drive elements 1, 2 is increased, and the speed of the other drive element is reduced. Consequently, the left and right endless tracks, not shown, are operated by the drive elements 1 and 2 at different speeds whereby the vehicle moves along a curve whose radius depends on the speed difference between the drive elements 1 and 2.

Another drive shaft 10 carries a bevel gear 17 meshing with gear rings 15 and 16 which mesh with planetary gears on planetary carriers 18 and 19 secured to flanges of control shaft 8. Sun gears 20 and 21 mesh with the planetary gears and have sensing means or measuring means 25, 26, see also FIG. 2, which transform the measured rotary speed into fluid pressure signals.

Brake devices 11 and 12 have stators 11a and 12a cooperating with rotors 22 and 23 which are fixedly secured to the sun gears 20 and 21 and rotate with the same about the axis of the control shaft 8 to which the planetary gear carriers 18 and 19 are fixedly secured.

When the control shaft 8 rotates in one direction, the drive elements 1 and 2 operate the tracks to move the vehicle in a curve to the right, while when the control shaft 8 rotates in the opposite direction, the drive elements 1 and 2 move the vehicle along a curve to the left.

The control shaft 8 is driven by operation of one of the two brake devices 11 and 12, as described in detail in the German AS 1,480,506, in the following manner.

During straight forward drive of the vehicle, the control shaft 8, and the planetary carriers 18 and 19 are at a standstill, and the two gear rings 15 and 16 are driven from the drive shaft 10 through bevel gear 17 so that the rotors 22 and 23 of the brake devices 11 and 12 are driven at a given number of revolutions through the planetary gears 18a, 19a and the sun gears 20 and 21.

If one of the fluid operated brake devices 11 or 12 is operated, as will be described hereinafter, rotary speed of the respective sun gear 20 or 21 is reduced, and assuming that the rotary speed of the two gear rings 15 and 16 remains constant, the rotary speed of the planetary carriers 18 and 19 is increased up from zero speed. The control shaft 8 is driven due to the reaction moment of the respective brake device, and the rotary speed of the control shaft 8 is the greater, the slower the rotor of the operative brake device 11 or 12 operates.

When one of the fluid operated brake devices 11 or 12 is not filled with fluid, there is no braking effect. If a brake device is filled with fluid through conduit 38, the rotor 22 or 23 is braked due to the required displacement of fluid in the brake device.

The drive shaft 10 is provided with a sensing means or measuring means 24 for measuring the rotary speed of the input drive shaft 10. Additional measuring devices 25 and 26 are provided at the rotors 22 or 23, or at portions of the sun gears 20 and 21 which are secured to and connected with rotors 22, 23, respectively.

Measuring means 25 is shown in detail, and it will be seen that a ring of liquid accumulates during rotation of the sun gear 20 in which the inlet of a conduit 25a is located for transmitting fluid pressure signals into the cylinder of a regulating piston 30'.

Figure 2:
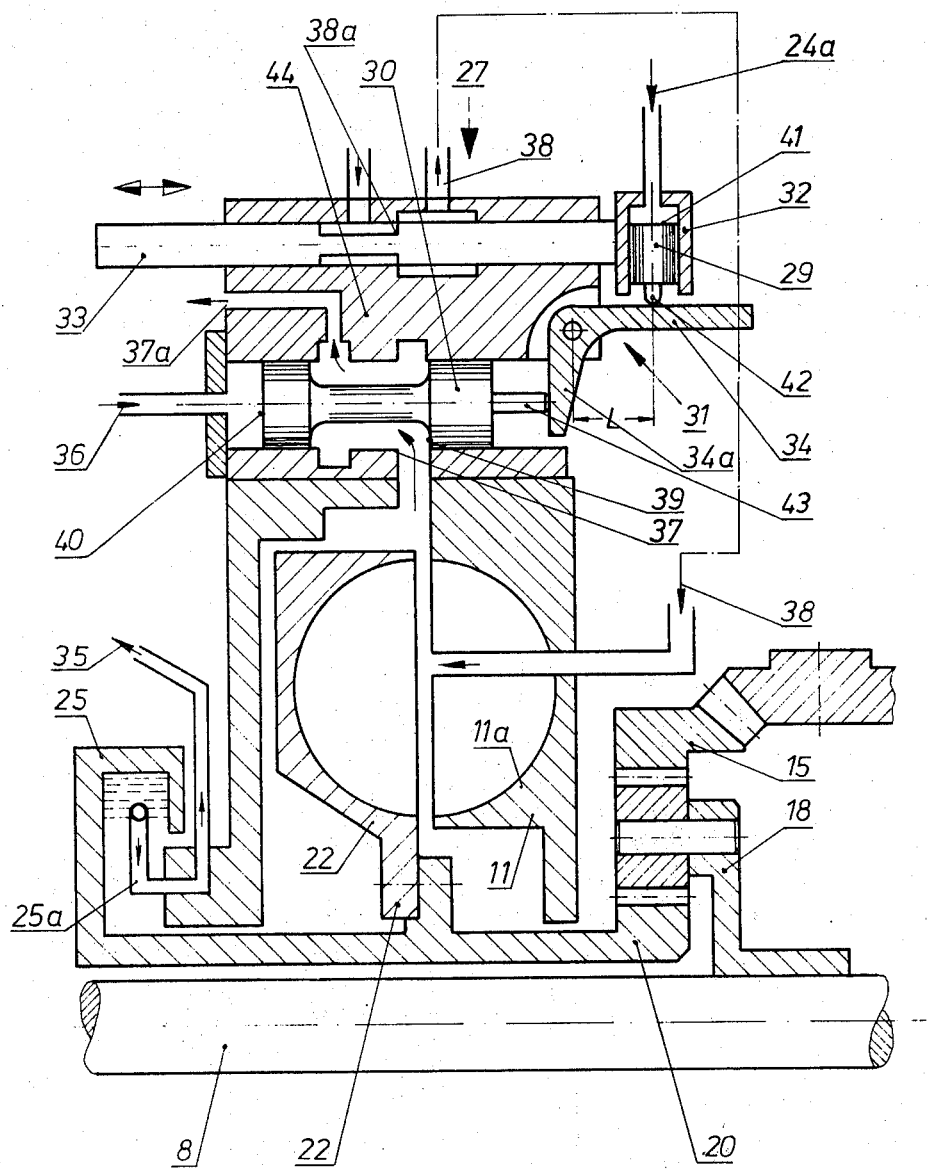
FIG. 2 is a fragmentary sectional view illustrating a detail of FIG. 1.

The sensing means or measuring means 26 operates in the same manner, and transmits fluid pressure signals through a conduit 36 into a pressure chamber formed in regulating cylinder 44 by the end face 40 of a regulating piston 30, as best seen in FIG. 2. The degree of filling of the brake devices 11 and 12 is controlled by the filling regulating valve means 27 and 27' which are constructed in the same manner, so that only the filling regulating valve 27 needs to be described in detail.

Filling regulating valve 27 includes a control piston 29 in a control cylinder 32 and a regulating piston 30 in regulating cylinder 44, which have projecting studs 42 and 43 respectively abutting guide faces on the two arms 34 and 34a of an angular balancing lever 31 which is supported for angular movement on a pivot pin 31a. The control cylinder 32 is secured to a slide or shaft 33 guided in a corresponding guideway in the regulating cylinder housing 44. When slide 33 is operated by steering means, not shown, control cylinder 32 and control piston 29 are moved with stud 42 along the arm 34 of the balancing lever 31 so that the effective lever arm L, that is the distance of stud 42 from pivot pin 31a, is changed in accordance with the desired rotary output speed. Slide 33 may be directly connected with steering means, not shown, or the connection may be obtained by mechanical, hydrostatic, or electric transmissions.

Control piston 29 forms in control cylinder 32 a pressure chamber bounded by the piston end face 41, and this pressure chamber communicates through a conduit 24b, and a conduit 24a, with measuring means 24, as shown in FIG. 1. Fluid pressure signals representing the rotary speed of the input drive shaft 10 are transmitted to the end face 41 to press control piston 29 against the balancing lever 31.

The regulating piston 30 has two piston portions and an annular recess therebetween, and is slidable in the cylinder bore of the regulating cylinder 44. Sensing means or measuring means 26, see FIG. 1, is connected by conduit 36 to supply fluid pressure signals to the pressure chamber in regulating cylinder 44 bounded by the piston end face 40 so that the piston is urged toward the right, as viewed in FIG. 2, to exert pressure by stud 43 against the arm 34a of balancing lever 21, at a predetermined effective radius.

Sensing means or measuring means 25, which measures the rotary speed of the sun gear 20 or of the brake rotor 22, is connected by a conduit 35 with the inlet of the regulating cylinder in which the regulating piston 30' forms a chamber so that regulating piston 30' is urged into engagement with one arm of balancing lever 31' whose other arm is subjected to the pressure of the regulating piston 29' whose position can be adjusted by operation of the slide 33'.

It will be noted that the sensing means 25 or 26 which measure the rotary speeds of the brake rotors 22, 23, respectively, are connected with the regulating pistons 30' and 30, respectively, which cooperate with the respective other brake rotor 23 and 22. The pressure acting on the regulating piston 30 of the filling valve means 27 is derived from the measuring means 26 of the other filling valve means 27' whose brake device 12 was not operated. The fluid pressure depends on the rotary speed of the control shaft 8.

During straight forward drive of the vehicle, the control shaft 8 is at a standstill, and the balancing levers 31 and 31' are in equilibrium. The pressure fluid conduit 37 and its discharge opening 37a are open, and the brake device 11 is empty. The same conditions prevail for the brake device 12. When the shaft or slide 33 is operated by the driver turning the steering wheel, not shown, control piston 29 is moved to the right, as viewed in FIG. 2, so that the equilibrium at the balancing lever 31 is distributed by a variation of the effective lever arm L.

The displacement of the slide or shaft 33 causes at the same time opening of a valve 38a so that operating fluid flows through the pressure conduit 38, into the brake device 11 of the fluid operated means 11, 12 so that stator 11a and rotor 22 are filled with fluid.

Since rotor 22 has now to displace the fluid in the brake device 11, it is braked, together with the sun gear 20.

Due to the increase of the length of the effective lever arm L of arm 34, the regulating piston 30 is moved to the left by lever arm 34a so that the control edge 39 of piston 30 closes gradually the port 37, throttling the flow through port 37 and discharge outlet 37a, so that the brake device 11 is filled with fluid. The brake device 11 remains in filled condition until due to the increase of the rotary speed of control shaft 8, caused by differential transmissions 18, 20, a higher pressure is produced in the measuring means 26 so that pressure fluid is supplied through conduit 36 into the pressure chamber of regulating cylinder 44, and regulating piston 30 acts with a greater force on balancing lever 31 so that the equilibrium is restored at the balancing lever 31.

By displacement of the actuating slide or shaft 33, any desired rotary speed of control shaft 8 can be continuously obtained while the motor and input drive shaft rotate at a constant speed. If the speed of the input shaft means 3 and 10 is adjusted, the pressure signals produced by the sensing or measuring means 24 is transmitted through conduits 24a, 24b to the control piston 29 so that the equilibrium of the balancing lever is disturbed. Upon increase of the rotary speed of the drive shaft, the stud 42 of control piston 29 exerts a greater pressure on the balancing lever 31, and upon reduction of the rotary input speed, a lesser pressure is exerted on arm 34 of balancing lever 31, and the regulating piston 30 is accordingly displaced by the balancing lever 31 so that the port 39 of conduit 38, 37 is again throttled by regulating piston 30. This causes a variation of the speed of control shaft 8 until due to the different pressure measured by sensing means 26, the equilibrium at the balancing lever 31 is again restored. The variation of the speed of control shaft 8 necessarily takes place at the same ratio as the variation of the motor speed and speed of the input drive shaft means 10.

In the event that the rotary speed of the control shaft 8 is caused by ground conditions, for example due to slipping of a track, the ratio of the rotary speeds of the drive shaft 10 and of the control shaft 8, selected by operation of actuating slide 33 and displacement of control piston 29, is again restored. The slipping track causes an increased rotary speed of the control shaft 8, by which the pressure on the end face 40 of the regulating piston 30 is increased by the speed sensing means 26. The regulating piston is moved to the right, as viewed in the drawing, and opens a greater cross section of the port 37 so that more fluid is discharged from brake device 11 out of discharge outlet 37a. Due to the reduced filling of the brake device 11, the rotary speed of control shaft 8 is correspondingly reduced by differential transmissions 20, 18. The radius of the curve determined by operation of the actuating slide 33, is thus maintained by holding constant the ratio between the rotary speeds of the control shaft 8 and the drive shaft 10 or of the motor shaft, not shown. If a constant radius of the driven curve is desired, if during driving in a curve, the ratio in transmission 3 is changed, causing a speed variation of the two drive element 1 and 2, it is only necessary to place the speed measuring means 24 instead at the drive shaft 10, on shafts 1a and 2a behind the transmissions 4 and 5.

It will be understood that each of the elements described above, or two or more together, may also find a useful application in other types of apparatus for controlling the speed of a transmission differing from the type described above.

While the invention has been illustrated and described as embodied in an apparatus for controlling the speed of the drive elements of a track laying vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims.

I claim:

1. Apparatus for controlling the speed of a transmission, comprising drive shaft means; first sensing means for measuring the speed of said drive shaft means and for producing a corresponding first fluid pressure signal; a control cylinder, a control piston in said control cylinder forming a pressure chamber having an inlet for receiving said first fluid pressure signal whereby pressure is applied to said control piston; a transmission; second sensing means for measuring the speed of said transmission and for producing a corresponding second fluid pressure signal; filling regulating valve means including a regulating cylinder, a regulating piston in said regulating cylinder forming a pressure chamber having an inlet for receiving said second fluid pressure signal whereby pressure is applied to said regulating piston, said regulating piston forming in said regulating cylinder a regulating valve; a balancing means turnable about an axis and having on opposite sides of said axis, first and second portions engaged by said control piston and said regulating piston, respectively, for holding said balancing means normally in a position of equilibrium; fluid operated means connected with said transmission for influencing the speed thereof, and including a filling conduit controlled by said regulating valve when said regulating piston is displaced in said regulating cylinder by said balancing means; and actuating means connected with one of said cylinders for moving the respective piston along the respective portion of said balancing means toward and away from said axis to a position representing the desired speed of said transmission so that said regulating piston is displaced in said regulating cylinder and said regulating valve operated to cause filling of said fluid operated means and a variation of the speed of said transmission to said desired speed by said fluid operated means.

2. Apparatus as claimed in claim 1, wherein said first and second sensing means are first and second measuring means for measuring rotary speeds and for representing measured rotary speeds by corresponding fluid pressure variations.

3. Apparatus as claimed in claim 1, wherein said actuating means includes a slide fixed to said control cylinder, and being mounted for movement along said first portion of said balancing means so that the effective lever arm of the pressure exerted by said control piston on said first portion is varied in accordance with a selected desired speed.

4. Apparatus as claimed in claim 1, wherein said control piston and said regulating piston have free end faces with centrally located projecting studs abutting said balancing means.

5. Apparatus as claimed in claim 4, wherein said balancing means includes a double-armed lever having first and second arms forming said first and second portions.

6. Apparatus as claimed in claim 5, wherein said lever is an angular lever, and wherein said control piston and said regulating piston move at right angles to each other and to said first and second arms.

7. Apparatus as claimed in claim 1, wherein said fluid operated means includes an inlet for said filling conduit, and an outlet port opening into said regulating cylinder, said regulating cylinder having a discharge outlet; and wherein said regulating piston has an edge cooperating with said outlet port to form said regulating valve, said outlet port being varied when said regulating piston is displaced in said regulating chamber by said balancing means.

8. Apparatus as claimed in claim 1, wherein said transmission includes a second drive shaft, rotary drive elements at the ends of said second drive shaft, a control shaft, first differential transmission means connecting said rotary drive elements with said second drive shaft and said control shaft so that the speed of said drive elements is different when said control shaft rotates or stops, respectively, second differential transmission means connecting said first drive shaft and said fluid operated means with said control shaft so that the speed of said control shaft is different when said fluid operated means is empty and filled, respectively, by said filling conduit; and wherein said first sensing means measure the speed of said drive shaft means, and said second sensing means measure the speed of the part of said second differential transmission means which is connected with said fluid operated means.

9. Apparatus as claimed in claim 8, wherein said fluid operated means includes a stationary part and a rotary part braked by said stationary part when said regulating piston is displaced in said regulating cylinder and said regulating valve permits filling of said fluid operated means with fluid from said filling conduit.

10. Apparatus as claimed in claim 8, wherein said actuating means includes a manually operated part for selecting a desired speed of said drive element, and being connected with said control cylinder for moving said control piston along said balancing means to a position representing the desired speed.

11. Apparatus as claimed in claim 10, comprising first and second filling regulating valve means, and first and second control pistons, wherein said fluid operated means include first and second fluid operated fluid brake devices having rotors and stators and being controlled by said first and second filling regulating valve means; wherein said second differential transmission means include first and second differential transmissions connecting said rotors of said first and second brake devices with said control shaft and with said drive shaft means, so that said rotors rotate at the same speed when said control shaft is stopped whereby filling of one of said brake devices due to operation of said manually operated part causes a speed reduction of the respective rotor, and a speed increase of the respective other rotor.

12. Apparatus as claimed in claim 11, wherein said second sensing means include two second measuring elements for measuring the speeds of said rotors and of said control shaft, and wherein each second measuring element is connected with said inlet of said pressure chamber of the regulating cylinder of the respective other regulating valve means for supplying thereto a fluid pressure signal.

13. Apparatus as claimed in claim 12, wherein the speed of the rotor of the filled brake device produces fluid pressure signals received by the inlet of said pressure chamber of the regulating chamber of the filling regulating valve means whose regulating piston operates said regulating valve for the rotor of the unfilled brake device.

* * * * *